(12) United States Patent  
Weston

(10) Patent No.: US 7,465,158 B2  
(45) Date of Patent: Dec. 16, 2008

(54) REDUCTION GEAR PUMP

(76) Inventor: Bevan Weston, 1402-C N. 26th Ave., Phoenix, AZ (US) 85009

( * ) Notice: Subject to any disclaimer, the term of this patent is extended or adjusted under 35 U.S.C. 154(b) by 0 days.

(21) Appl. No.: 11/696,512

(22) Filed: Apr. 4, 2007

(65) Prior Publication Data

US 2007/0266818 A1    Nov. 22, 2007

(51) Int. Cl.
F01C 1/18 (2006.01)
(52) U.S. Cl. .............. 418/206.2; 418/206.8; 418/206.3; 418/205; 74/606 R; 74/606 A
(58) Field of Classification Search .............. 418/7, 418/9, 206.1, 206.2, 206.8, 179, 206.3, 205; 74/606 R, 606 A
See application file for complete search history.

(56) References Cited

U.S. PATENT DOCUMENTS

| 2,202,913 | A | * | 6/1940 | Johnson | 418/179 |
| 2,263,092 | A | * | 11/1941 | Johnson | 418/206.8 |
| 4,352,301 | A | * | 10/1982 | Fleury | 184/6.12 |
| 5,584,773 | A | * | 12/1996 | Kershaw et al. | 184/6.22 |
| 5,931,218 | A | * | 8/1999 | Carlson et al. | 165/47 |
| 6,155,135 | A | * | 12/2000 | Gage et al. | 74/606 A |
| 6,189,411 | B1 | * | 2/2001 | Francis | 418/206.1 |
| 7,189,178 | B2 | * | 3/2007 | Weith | 74/467 |

* cited by examiner

Primary Examiner—Thomas E Denion
Assistant Examiner—Mary A Davis
(74) Attorney, Agent, or Firm—Morgan & Finnegan, L.L.P.

(57) ABSTRACT

A gear pump for an axle assembly circulates lubricating fluid from a reservoir to a fluid cooler external to the axle assembly. The gear pump includes a first housing section and a second housing section and a center section located between the first and second housing sections. An input gear mounted on an input shaft is engaged with a reduction gear, which are located in a first housing section. Two pumping gears are located in the second housing section. The center section serves as a wall and separates the first housing section from the second housing section. The gear ratio between the input gear and the reduction gear is such that the pumping gears rotate at a speed between at about 47% and at about 75% of the speed of the input shaft.

12 Claims, 6 Drawing Sheets

APPENDIX

REDUCTION GEAR PUMP

FIELD OF INVENTION

The present invention relates generally to the field of lubrication. This invention more specifically relates to a gear pump for circulating the lubricating fluid for an axle assembly between a reservoir and a cooler.

BACKGROUND OF THE INVENTION

Lubricating fluid for an axle assembly is generally expected to prevent metal to metal contact between the relatively moving components. The fluid also acts as a coolant by absorbing the heat generated from friction and torque from the moving parts of the assembly. Axle assemblies are generally lubricated by a splash system. The outer housing of the differential assembly contains a reservoir of lubricating fluid. Part of the ring gear of the differential is immersed in the fluid. As the ring gear rotates, fluid splashes from the reservoir upward onto the other rotating parts of the differential and the axle assembly to lubricate them, and eventually drains back to the reservoir.

The lubricating fluid acts to remove heat from the components of the axle assembly, so the splashed fluid returns to the reservoir at an elevated temperature. For optimal performance, the fluid in the reservoir should be cooled. This can be accomplished with a cooler located external to the axle assembly. The heat from the lubricating fluid can be passed to the ambient air by convection in the external cooler. A pump is required to circulate the lubricating fluid between the reservoir and the cooler.

An example of such a pump is disclosed in U.S. Pat. No. 6,189,411 to Francis ("the '411 patent"), which is hereby fully incorporated by reference. The '411 patent discloses an axle assembly 100 that includes a gear pump for circulating fluid between a reservoir and an external cooler. This axle assembly can be seen in FIGS. 1-3. Referring to FIG. 1, the pump 101 is located inside the axle housing 102. Referring to FIG. 2, the pump assembly includes two intermeshing gears 103 and 104 that rotate to pump lubricating fluid from an inlet port 105 connected to the fluid reservoir at the bottom of the axle assembly to an outlet port 106 connected to the external fluid cooler (not shown). Referring to FIG. 3, gear 103 of the gear pump is directly connected to the end of the pinion shaft 107. The gear 103 is mounted on a hex spline 108 that fits within a hex bore 109 in the pinion shaft. The pinion shaft 107 is also geared to the ring gear 110 of the differential, which can be seen in FIG. 1. In particular a pinion gear 112 that is mounted on pinion shaft 107 meshes with the ring gear 110. The pinion shaft 107 rotates at the same speed as the output shaft of the transmission and is connected to the transmission output shaft by, for example, a drive shaft and two universal joints.

The '411 patent describes the axle assembly disclosed therein as being suitable for the rear axle of a racing vehicle. This is because the positioning of the gear pump inside the housing of the axle permits the ring gear of the differential to be replaced without removing the gear pump. (In racing vehicles, the ring gear of the differential is frequently changed, especially just before a race, to fine tune the gear ratio of the rear axle assembly.) It has been found, though, that in practice such an axle assembly, in particular the cooling system for the lubricating fluid, is not sufficient for race vehicles, for example a NASCAR Busch series vehicle. It has been found that the lubricant in the reservoir remains at too high of a temperature for too long and that the temperature of the lubricant fluctuates within too large a range.

What is needed in the art is an axle assembly that can maintain the lubrication fluid in the reservoir at a lower temperature and that can reduce the range of fluctuation of the temperature of the lubrication fluid in the reservoir.

SUMMARY OF THE INVENTION

The foundation of the invention is the recognition that the problem with a conventional axle assembly gear pump, such as disclosed in the '411 patent, is that it can cause cavitation in the lubrication fluid. Among other impacts, cavitation can cause breaks in the flow of lubrication fluid to the cooler. This can allow air or vapor to fill a portion of the cooler such that only a fraction of the cooler can be effective for cooling the lubrication fluid. As the temperature of the lubrication fluid rises, the fluid cannot remove heat from the components of the axle assembly as effectively. Additionally, the fluid cannot lubricate as effectively since the viscosity generally decreases as the temperature increases. Insufficient lubrication can cause scoring of the metal surfaces and temperature spikes. Cavitation can also cause the lubrication fluid to become aerated or to foam, in which state the lubrication fluid is, again, far less effective in preventing metal to metal contact and less able to act as a coolant. Thus cavitation in the lubricant pump can cause serious problems with the lubrication of the axle assembly.

Conventional axle assembly gear pumps can cause cavitation when the pump gears spin too fast. One of the pumping gears of the '411 patent is connected to the pinion shaft through a hex connection, so the pumping gears rotate at the same speed at the pinion shaft, which is typically between 9,000 and 10,000 revolutions per minute ("RPM") for a race vehicle. At speeds of about 8000 RPM or higher a gear pump can cause cavitation.

The problem is solved with a gear pump for an axle assembly according to the present invention. The gear pump includes a first housing section, a second housing section, and a center section located between the first and second housing section. An input gear is located in a first recess in the first housing section. The input gear is mounted on the input shaft of the gear pump. A reduction gear is located in a second recess in the first housing section and is meshed with the input gear. The reduction gear is mounted on and rotates a second shaft. A first pumping gear is also mounted on the second shaft. A second pumping gear mounted on a third shaft is meshed with the first pumping gear. When the first and second pumping gears rotate, they pump fluid in through an input port of the gear pump and out through an output port of the gear pump. The center section forms a wall of the pumping chamber of the gear pump and separates the first and second pumping gears from the input gear and the reduction gear.

In a further aspect of the invention, the input gear and the reduction gear are sized so that the second shaft spins at a speed that is at about 33% to at about 75%, preferably at about 47% to at about 75% the speed of the input shaft.

In a further aspect of the invention, the input gear and reduction gear are sized so that the second shaft spins at a speed that is at about 47% of crankshaft speed.

The pump of the invention can avoid cavitation, so that the lubricating fluid can be properly cooled and retain its effective viscosity. This avoids wear within the axle assembly and extends the effective life of the lubricating fluid.

BRIEF DESCRIPTION OF THE FIGURES

These and other aspects, features, and advantages of the invention will be more clearly understood by referring to the detailed description and accompanying drawings, where.

DETAILED DESCRIPTION OF THE INVENTION

Figure 4:
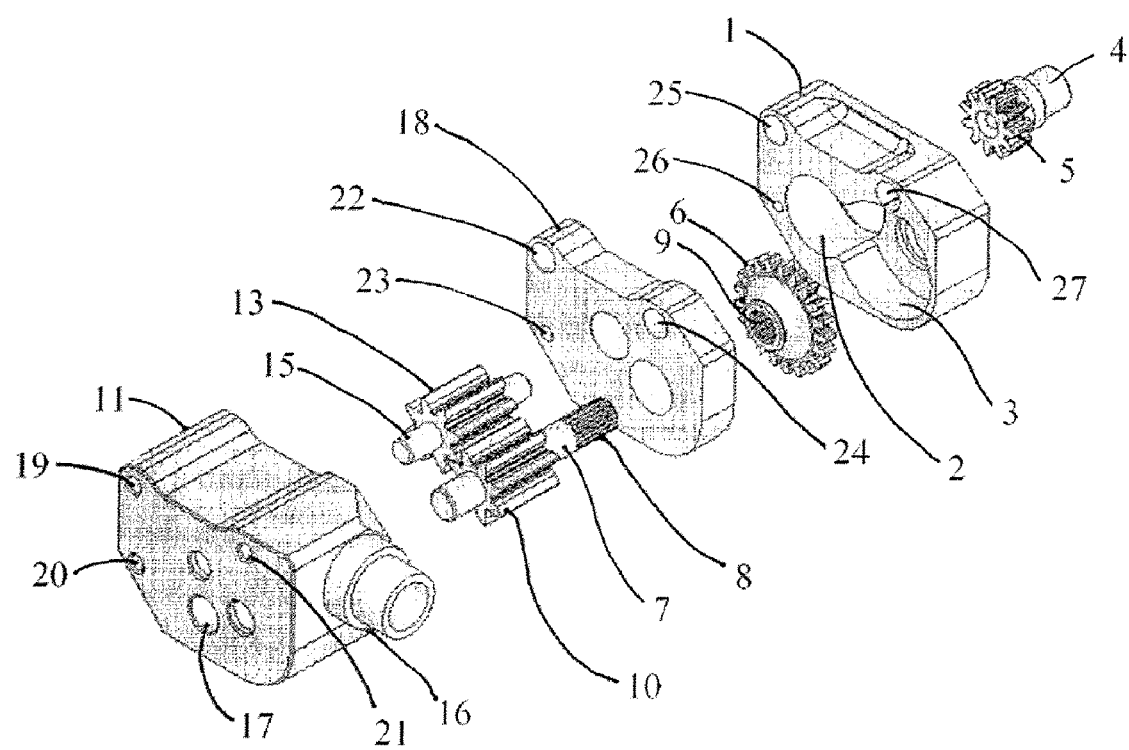
FIG. 4 is an exploded view of a pump that embodies the present invention.

FIG. 4 shows a pump for circulating lubricant from a reservoir to a cooler that embodies the present invention. A first housing section 1 includes a first recess 2 and a second recess 3. The first housing section 1 supports an input shaft 4. An input gear 5 located in the first recess 2 is mounted on the input shaft 4. The input gear 5 meshes with a reduction gear 6 that is located in the second recess 3. The first recess 2 and the second recess 3 together form a gear chamber for intermeshing input gear 5 and reduction gear 6.

Figure 5B:
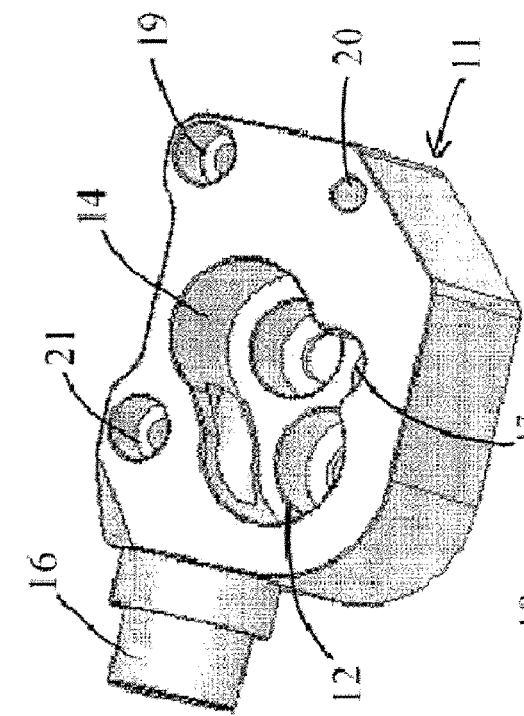
FIGS. 5A-5D are various views of one of the housing sections of the pump shown in FIG. 4.
Figure 5D:
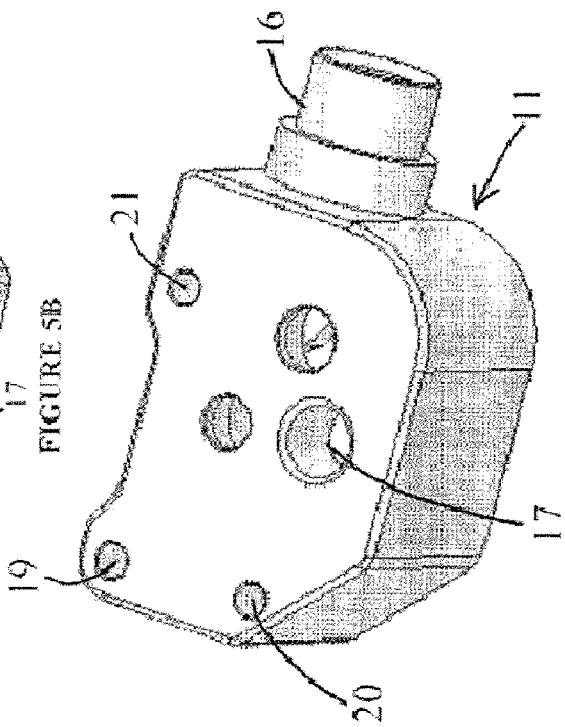
Figure 5A:
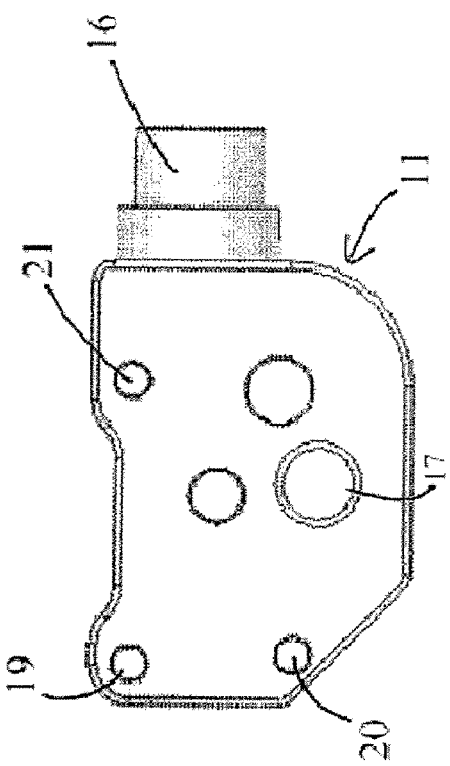
Figure 5C:
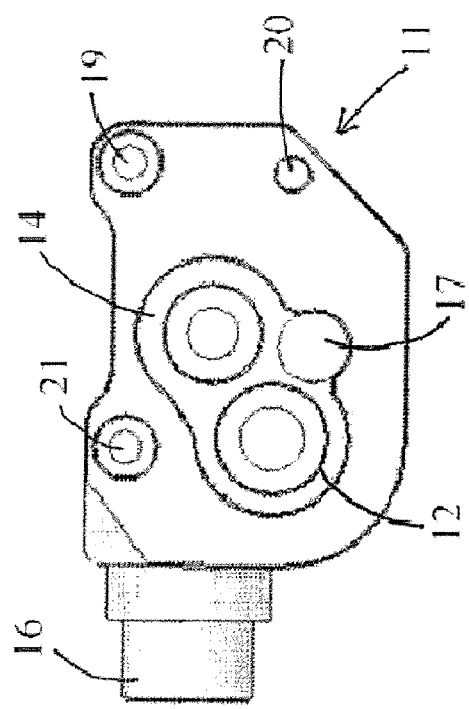
Figure 6:
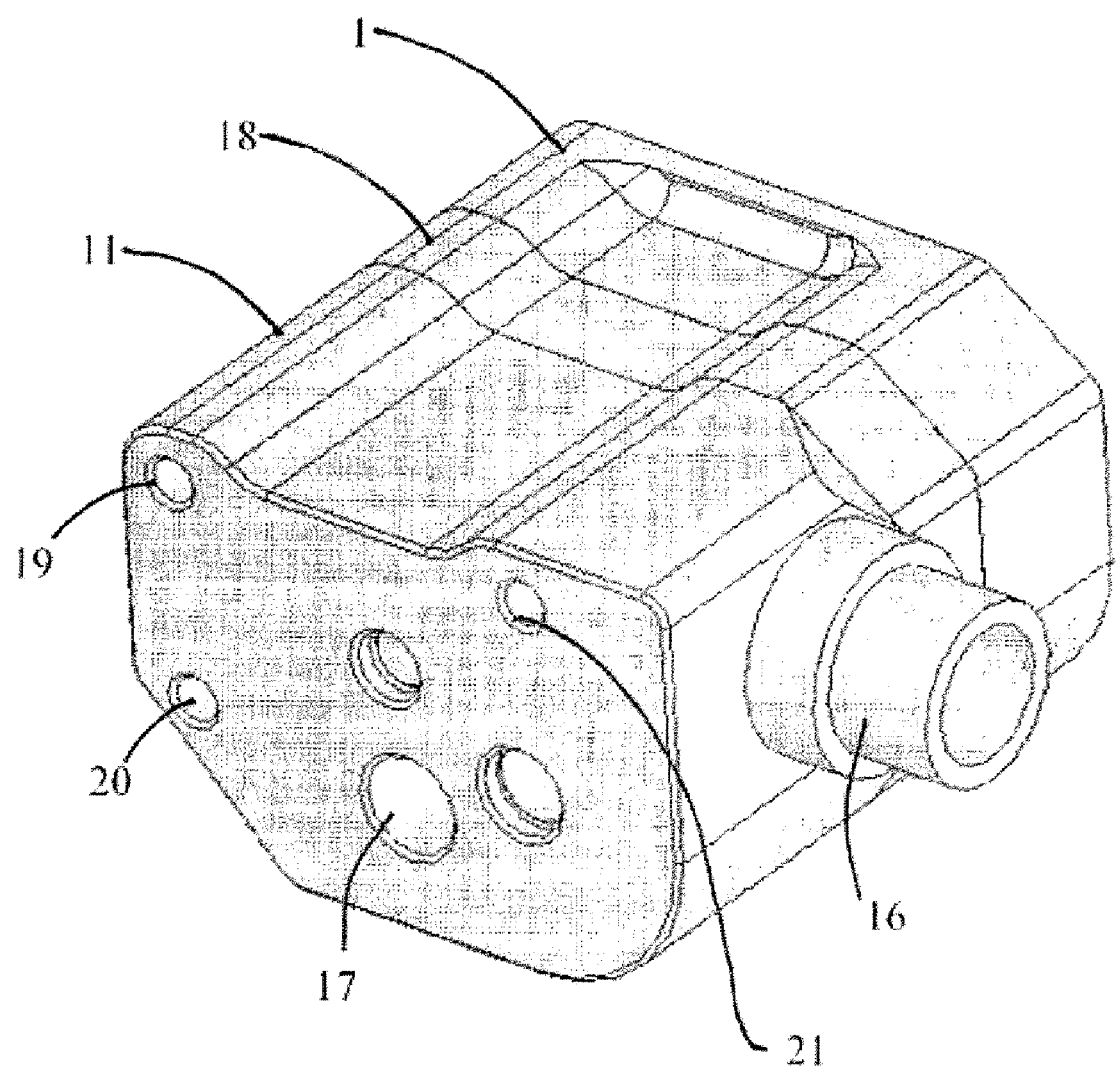
FIG. 6 is a perspective view of the outside of the pump shown in FIG. 4 as fully assembled.

The reduction gear 6 is mounted on a second shaft 7 by, for example, external splines 8 on the second shaft 7 that mate with internal splines 9 on reduction gear 6. The first housing section 1 supports the end of the second shaft 7 that is nearest the reduction gear 6. A first pumping gear 10 is also mounted on the second shaft 7. A second housing section 11 supports the end of the second shaft 7 that is nearest the first pumping gear 10. The second housing section 11 contains a first recess 12 (see FIG. 5B) in which the first pumping gear 10 is located.

The first pumping gear 10 meshes with a second pumping gear 13 located in a second recess 14 (see FIG. 5B) inside the second housing section 11. The second pumping gear 13 is mounted on a third shaft 15. One end of the third shaft 15 is supported by the second housing section 11. The first and second recesses 12 and 14 contained in the second housing section 11 form a pumping chamber between an input port 16 and an output port 17 of the pump. The input port 16 and the output port 17 of the pump are formed as recesses in second housing section 11. The recess in the second housing section 11 that forms the output port 17 of the gear pump may include internal threads so that a hose or conduit (not shown) that is connected to the external fluid cooler (not shown) can be connected to the output port 17.

A center section 18 separates the first housing section 1 and the second housing section 11. The center section supports both second shaft 7 at its middle and one end of the third shaft 15. It further serves as a wall that defines one side of the pumping chamber and it separates the pumping chamber containing the first and second pumping gears 10 and 13 from the input gear 5 and the reduction gear 6. This prevents high pressure fluid within the gear pump chamber from entering the chamber containing the input gear and the reduction gear.

The first housing section 1, second housing section 11, and center section 18 may be constructed of aluminum. The two housing sections 1 and 11 and the center section 18 may contain multiple through holes 19-27. Each through hole on one of the sections aligns with a through hole on each of the other sections. The aligned through holes receive bolts (not shown) that fasten the three sections together. The entire gear pump can be mounted to the inside of the axle housing. The shafts and gears, particularly the second and third shafts 7 and 15 upon which the pumping gears 10 and 13, respectively, are mounted, may be constructed of steel.

Figure 1:
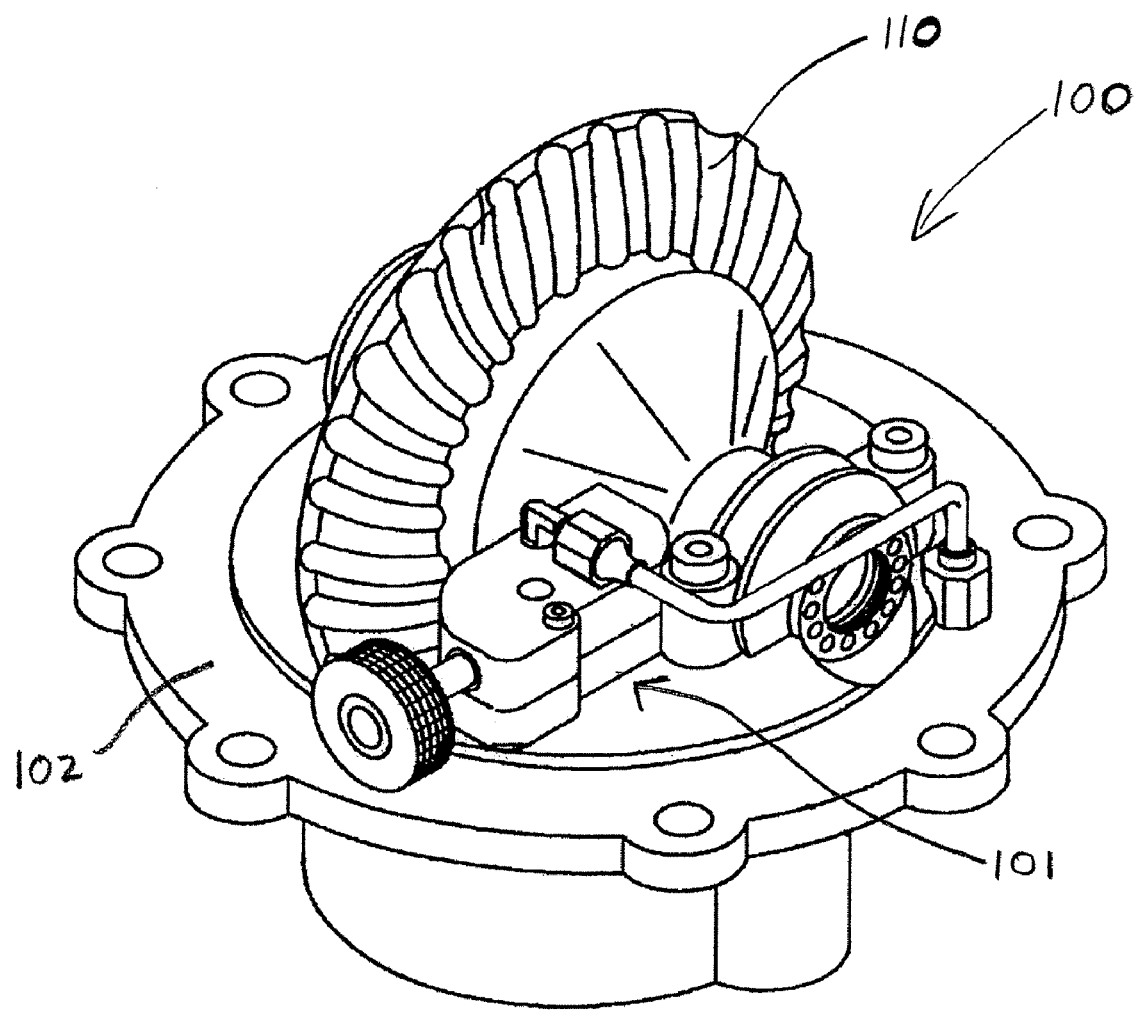
FIG. 1 is an elevated view of a known axle assembly including a gear pump for pumping lubricating fluid to and from a cooler.
Figure 2:
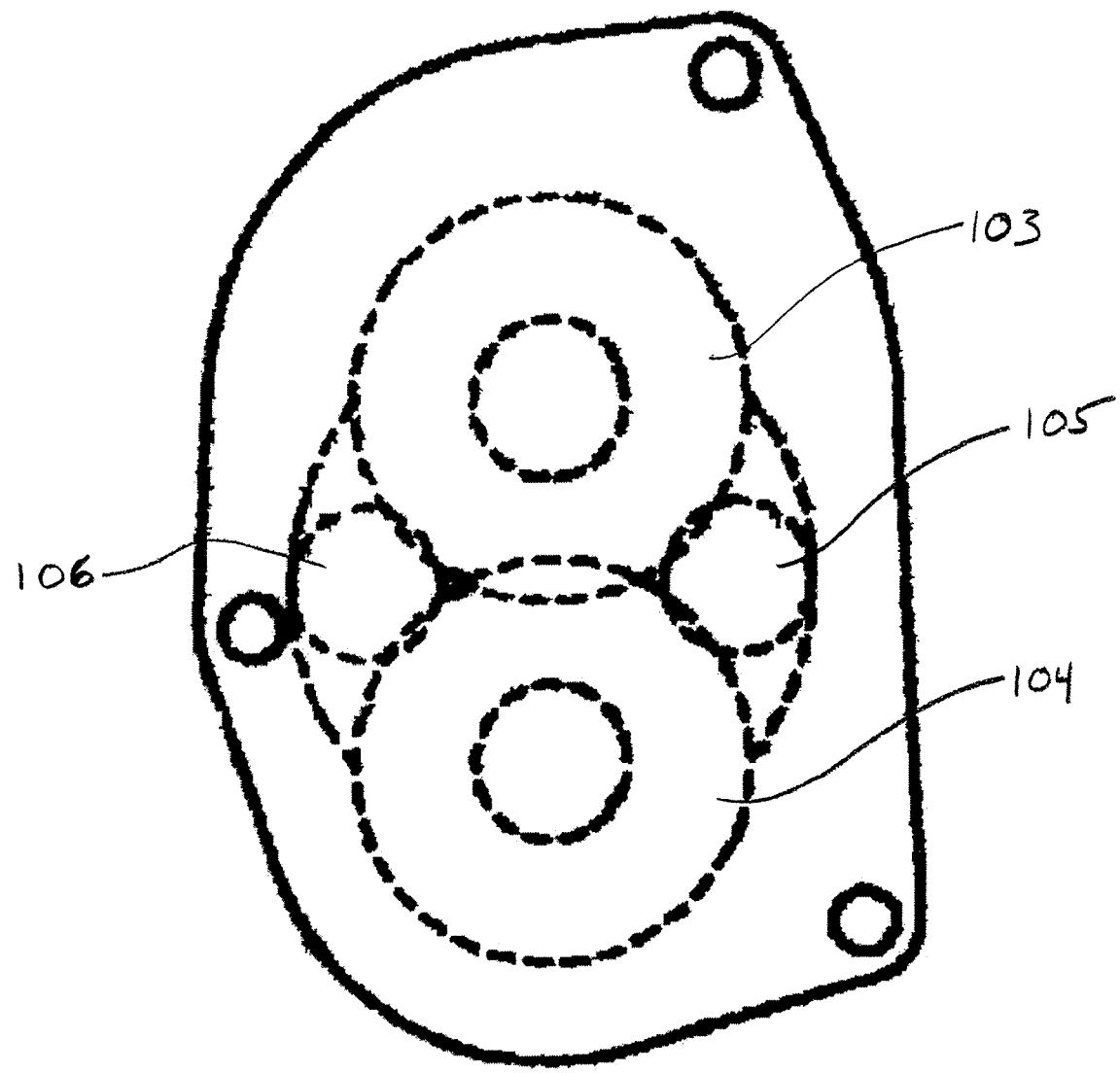
FIG. 2 is a sectional view of the gear pump of the known axle assembly shown in FIG. 1.
Figure 3:
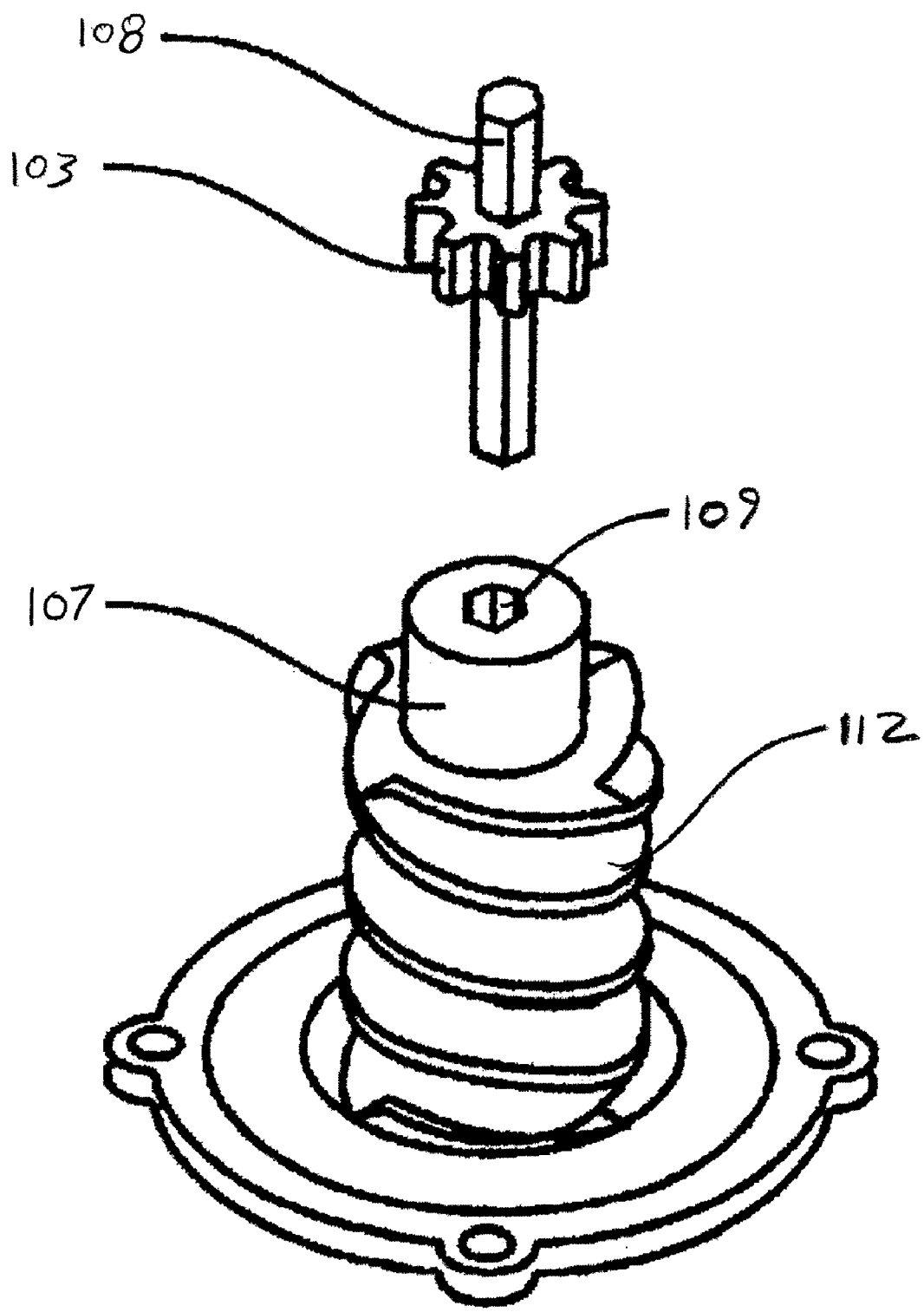
FIG. 3 shows the connection between the pinion shaft and one of the pumping gears of the gear pump in the known axle assembly shown in FIG. 1.

The input shaft 4 can be connected to the end of the pinion shaft by, for example, a hex spline connection like the one shown in FIG. 3. In operation, the input shaft rotates at the same speed as the pinion shaft. The input gear and the reduction gear reduce this rotation rate so that the pump gears spin at a lower rate of rotation. The sized difference between the input gear 5 and the reduction gear 6, i.e., the gear ratio, determines the amount of speed reduction. It is preferred that the input gear 5 and the reduction gear 6 are sized so that the pumping gears rotate at about 47% of the input shaft speed, i.e., 47% of the pinion shaft speed. In other words, the reduction gear 6 should be slightly more than double the size of the input gear 5. Nevertheless, it may be desirable to operate the pump at a higher or lower speed. For example, during a race on a short track, or on a track with tight turns, the air speed across the cooler may be less on average than during a race on a more standard track. The lower rate of heat removal due to lower air speed could be compensated by circulating the lubricant more slowly, such as, e.g., by running the pumping gears at about 47% of the speed of the pinion shaft. Similarly, during a higher speed race it may be desired to circulate the lubricant more quickly, while still avoiding cavitation, such as, e.g., by rotating the pumping gears at about 75% of pinion shaft speed to provide a more uniform lubricant temperature within the lubricant reservoir.

When the pumping gears are rotating, fluid from the reservoir is pulled into the input port 16 of the pump and then pushed out of the output port 17 of the pump to the fluid cooler and then back to the reservoir. The fluid pressure created by the pump forces lubricant to fill the space between the second and third shafts 7 and 15 and their supporting recesses in the second pump section 11 and the center section 18 so that the shafts can rotate smoothly. The fact that the shafts 7 and 15 are made of a different material (steel) than the housing (aluminum) also helps the shafts to rotate smoothly. As a result, these shafts do not have to be mounted in shaft bearings.

The pinion shaft may be mounted to the axle housing closer to the bottom of the housing so that when the gear pump is connected to it, the gear pump is fully or partially submerged in the fluid reservoir at the bottom of the axle housing. Alternatively, the gear pump may be oriented so that it is fully or partially submerged in the fluid reservoir. The first housing section 1 may contain additional holes so that the fluid in the reservoir lubricates the input gear 5 and the reduction gear 6.

The temperature in the lubricant reservoir of a NASCAR Busch series race car fitted with a conventional pump in its rear axle assembly, after multiple laps on a ¾-mile track to achieve roughly steady state, can be about 200 degrees Fahrenheit. During additional laps the temperature can vary about 30 degrees Fahrenheit. In contrast, the temperature of the fluid in the reservoir of a NASCAR Busch series race car fitted with a pump embodying the invention stabilized after multiple laps at about 160 degrees Fahrenheit, with a variation of less than about 10 degrees Fahrenheit (more particularly, about 6 degrees Fahrenheit) during subsequent laps.

The invention has been described with reference to certain embodiments. However, various modifications, alterations, substitutions, and additions to the disclosed embodiments are within the spirit and scope of the invention. Additionally, embodiments that have not been described in detail are within the scope of the invention. For example, while the invention has been described in terms of rear axle assemblies of racing vehicles, the invention is not intended to be limited to either rear axle assemblies or racing vehicle applications. The invention may be incorporated with a front axle assembly or other gear assemblies subject to high torque, speed, or power requirements, such as a transfer case for a four-wheel drive vehicle. Therefore, the invention should not be limited to the description of the embodiments described herein.

What is claimed is:

1. A gear pump for circulating lubricating fluid between a reservoir and a cooler for an axle assembly comprising:
   a first housing section configured to receive an input gear mounted on an input shaft for coupling to a pinion shaft of the axle assembly, the input gear being engaged with a reduction gear inside the first housing section; and
   a second housing section configured to receive a first pumping gear and a second pumping gear each mounted on a second shaft and a third shaft, respectively, inside the second housing section, the second shaft being coupled to the reduction gear on one end,
   wherein each of the input gear and the reduction gear is configured in such a way that the rotation speed of the second shaft is lower than the rotation speed of the input shaft thereby the rotation speed of the first and second pumping gears is also lower than the rotation speed of the input shaft.

2. The gear pump according to claim 1, wherein the input gear and the reduction gear is configured in such a way that the rotation speed of the second shaft is between at about 47% and at about 75% of the rotation speed of the input shaft.

3. The gear pump according to claim 1, wherein the first and second housing sections are made from aluminum.

4. The gear pump according to claim 1, wherein the second and third shafts are made from steel.

5. The gear pump according to claim 1 further comprising:
   a center section, disposed between the first housing section and the second housing section thereby supporting the second shaft and the third shaft through holes formed thereon, configured to separate the first and second housing sections.

6. The gear pump according to claim 5, wherein the center section is made from aluminum.

7. An axle assembly lubricant/coolant gear pump for conducting lubricant/coolant out of a reservoir in an axle housing, the axle housing having a bearing for a pinion shaft, said gear pump comprising:
   a hollow casing removably mountable to the interior of the axle housing, said casing defining an interior chamber;
   a first pair of pump gears contained within said interior chamber, said first pair of pump gears comprising:
      a first drive gear mounted on a first drive gear shaft for coupling to the pinion shaft, said first drive gear having teeth, said first drive gear shaft comprising a hex-spline; and
      a first driven gear coupled to said first drive gear, said first driven gear having teeth non-tooth tolerantly engaging said teeth of said first drive gear;
   a second pair of pump gears contained within said interior chamber, said second pair of pump gears comprising:
      a second drive gear mounted on a second drive gear shaft for coupling to said first driven gear, said second drive gear having teeth; and
      a second driven gear coupled to said second drive gear, said second driven gear mounted on a second driven gear shaft, said second driven gear having teeth non-tooth tolerantly engaging said teeth of said second drive gear;
   an input port formed in and through said casing for receiving lubricant/coolant into said interior chamber;
   means for conducting lubricant/coolant into said pump connected to said input port;
   an output port formed in and through said casing for directing lubricant/coolant away from said interior chamber; and
   wherein each of said first drive gear and said first driven gear is configured in such a way that the rotation speed of said second drive gear shaft is lower than the rotation speed of said first drive gear shaft thereby the rotation speed of said second drive gear and said second driven gear is also lower than the rotation speed of said first drive gear shaft.

8. The axle assembly according to claim 7, wherein each of said first drive gear and said first driven gear is configured in such a way that the rotation speed of said second drive gear shaft is between at about 47% and at about 75% of the rotation speed of said first drive gear shaft.

9. The axle assembly according to claim 7, wherein said casing is made from aluminum.

10. The axle assembly according to claim 7, wherein said second drive gear shaft and said second driven gear shaft are made from steel.

11. The axle assembly according to claim 7, further comprising:
    a separating unit, disposed between said first pair of pump gears and said second pair of pump gears thereby supporting said second drive gear shaft and said second driven gear shaft through holes formed thereon, configured to separate said first pair of pump gears and said second pair of pump gears.

12. The axle assembly according to claim 11, wherein said separating unit is made from aluminum.

* * * * *

UNITED STATES PATENT AND TRADEMARK OFFICE
CERTIFICATE OF CORRECTION

| | | |
|---|---|---|
| PATENT NO. | : 7,465,158 B2 | Page 1 of 1 |
| APPLICATION NO. | : 11/696512 | |
| DATED | : December 16, 2008 | |
| INVENTOR(S) | : Bevan Weston | |

It is certified that error appears in the above-identified patent and that said Letters Patent is hereby corrected as shown below:

Column 1, line 3,
Please add to the specification before FIELD OF INVENTION the following:
 -- This application claims priority under 35 U.S.C. §119(e) to U.S. Provisional Application Serial No. 60/744,210, filed on April 4, 2006. --

Signed and Sealed this

First Day of December, 2009

David J. Kappos
*Director of the United States Patent and Trademark Office*